United States Patent [19]

McCarthy

[11] 4,367,857
[45] Jan. 11, 1983

[54] ADJUSTABLE HOT PIPE BRACKET

[75] Inventor: Bartholomew J. McCarthy, Redwood City, Calif.

[73] Assignee: Cleasby Manufacturing Co., Inc., San Francisco, Calif.

[21] Appl. No.: 220,838

[22] Filed: Dec. 29, 1980

[51] Int. Cl.³ .............................................. F16L 3/08
[52] U.S. Cl. .................................... 248/74 R; 248/75
[58] Field of Search ................... 248/74 R, 75, 77, 81, 248/49, 72, 226.1, 65, 70, 73; 251/294; 137/257, 360, 368; 182/57, 59, 142

[56] References Cited

U.S. PATENT DOCUMENTS

| 370,739 | 9/1887 | Hysan | 182/57 |
| 532,019 | 1/1895 | Bourke | 182/59 |
| 784,979 | 3/1905 | Bruce | 248/74 R |
| 1,468,717 | 9/1923 | Kienle | 182/57 |
| 1,583,772 | 5/1926 | Blaw | 248/77 |
| 3,871,480 | 3/1975 | Sauri | 182/142 |

Primary Examiner—William H. Schultz
Assistant Examiner—Ramon O. Ramirez
Attorney, Agent, or Firm—Naylor, Neal & Uilkema

[57] ABSTRACT

A roof parapet mounting bracket is provided with a pivotally mounted clamp for connection to hot tar pipes. It is also provided with a roller guide for a tar valve control rope.

2 Claims, 4 Drawing Figures

ADJUSTABLE HOT PIPE BRACKET

BACKGROUND OF THE INVENTION

In the roofing industry it has been the practice to pump hot tar from tar kettles to roofs through pipes which have been tied to access ladders. This practice unduly exposes workers to burns through contact with such hot tar pipes.

SUMMARY OF THE INVENTION

The principal object of the invention is to provide an adjustable parapet mounting bracket support for a universally mounted hot pipe clamping ring.

A further object of the invention is to provide such a mounting bracket with roller guide means for a rope pull for the kettle tar value.

Other objects and advantages of the invention will be apparent from the following description taken in conjunction with the drawing forming part of this specification.

DESCRIPTION OF THE PREFERRED EMBODIMENT

Figure 1:
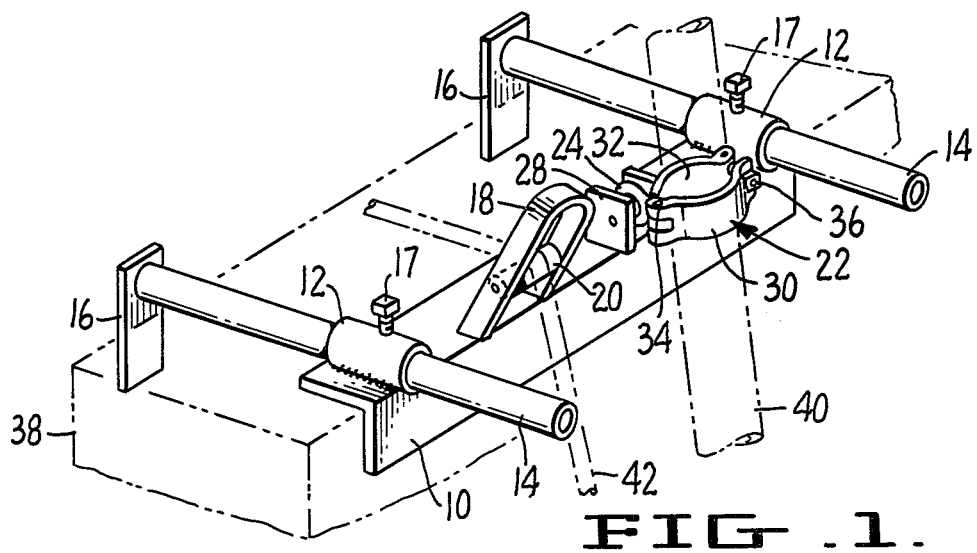
FIG. 1 is a view in perspective of the ajustable bracket of the invention.
Figure 2:
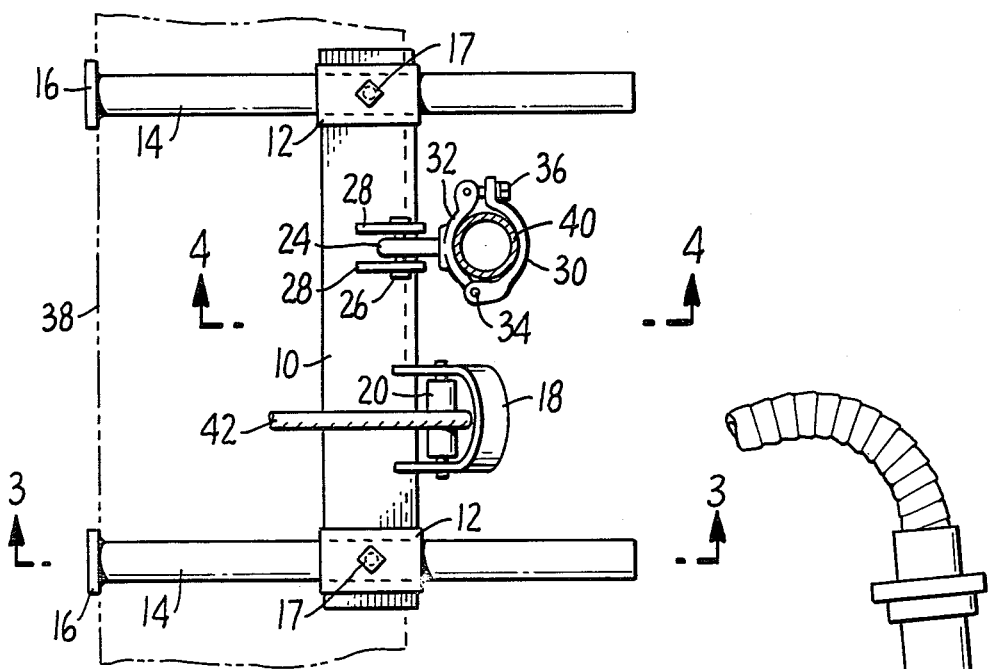
FIG. 2 is a top plan view of the bracket of FIG. 1.
Figure 4:
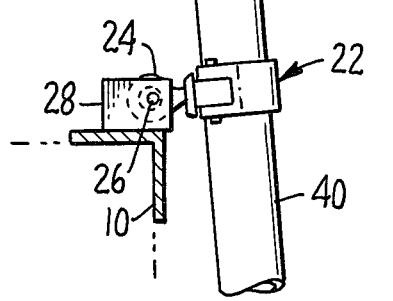
FIG. 4 is a view taken along lines 4—4 of FIG. 2.
Figure 3:
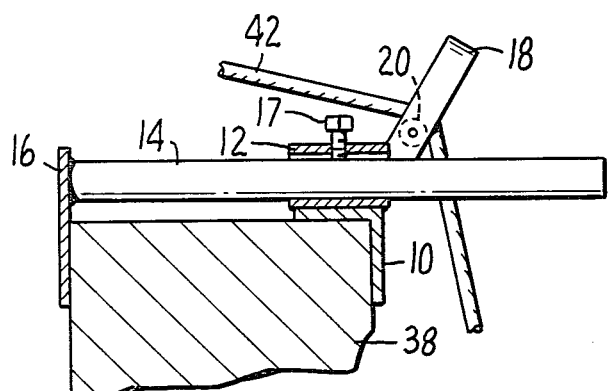
FIG. 3 is a view taken along lines 3—3 of FIG. 2.

The mounting bracket system of the invention comprises angle member 10, sleeve members 12 welded thereto, pipe members 14 supported by sleeve members 12, flange members 16 secured to pipe members 14, set screws 17 to lock the pipe members 14 to the sleeve members 12, a U-shaped guide 18 secured to angle member 10 provided with a roller element 20, and a hose clamp 22 having a universal connection with stem element 24 which is pivotally mounted on pin 26 carried by support elements 28 welded to angle member 10.

The hose clamp 22 comprises clamping members 30 and 32, pivot pin 34, and releasable fastening means 36.

The hot pipe support bracket is attached to any given size of parapet 38 which may be encountered by disposing angle 10 and flange element 16 in clamping relation to the sides of the parapet and tightening the set screws 17.

The hot tar pipe 40 is then secured within clamp 22.

The tar valve control rope 42 is then passed through the guide 18 over the roller 20.

The subject adjustable hot pipe bracket provides for a safer and more positive fastening of hot pipes to buildings as they extend from tar kettles to roofs.

What is claimed is:

1. A mounting bracket for connecting hot tar pipes to building parapets comprising an elongated unitary angle member to be disposed in direct clamping relation to the upper and outer side of a parapet, said member having outer end portions and an intermediate portion, a pair of sleeve members positioned above and fixedly attached to the angle member and extending transversely thereof at said outer end portions, a pair of tubular members slidably disposed in said sleeve members, said tubular members having at their inner or roof-adjacent ends flange elements to be disposed in clamping relation to the inner side of said parapet, a pipe clamp connected to the intermediate portion of said angle member, said clamp being positionable outwardly of said angle member and said parapet and having a universal pivot connection with said angle member, and means to adjustably and releasably connect said tubular members in fixed relation with said sleeve members.

2. The mounting bracket of claim 1, including a rope guide member fixedly attached to said angle member and extending upwardly and outwardly from the intermediate portion of said angle member at one side of said pipe clamp, said rope guide member having a roller element positioned to be disposed outwardly of the outer side of said parapet.

* * * * *